(12) United States Patent
Carlson et al.

(10) Patent No.: US 8,756,382 B1
(45) Date of Patent: Jun. 17, 2014

(54) METHOD FOR FILE BASED SHINGLED DATA STORAGE UTILIZING MULTIPLE MEDIA TYPES

(75) Inventors: Marcus A. Carlson, Berthoud, CO (US); David C. Pruett, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 167 days.

(21) Appl. No.: 13/173,587

(22) Filed: Jun. 30, 2011

(51) Int. Cl.
*G06F 13/00* (2006.01)
*G06F 13/28* (2006.01)

(52) U.S. Cl.
USPC ........... 711/154; 711/170; 711/103; 711/112; 711/E12.084

(58) Field of Classification Search
None
See application file for complete search history.

(56) References Cited

U.S. PATENT DOCUMENTS

| | | | |
|---|---|---|---|
| 5,450,560 A | 9/1995 | Bridges et al. |
| 5,574,882 A | 11/1996 | Menon et al. |
| 5,613,066 A | 3/1997 | Matsushima et al. |
| 5,680,538 A | 10/1997 | Jones et al. |
| 5,696,921 A | 12/1997 | Holt |
| 6,016,553 A | 1/2000 | Schneider et al. |
| 6,092,231 A | 7/2000 | Sze |
| 6,148,368 A | 11/2000 | DeKoning |
| 6,185,063 B1 | 2/2001 | Cameron |
| 6,202,121 B1 | 3/2001 | Walsh et al. |
| 6,324,604 B1 | 11/2001 | Don et al. |
| 6,339,811 B1 | 1/2002 | Gaertner et al. |
| 6,501,905 B1 | 12/2002 | Kimura |
| 6,574,774 B1 | 6/2003 | Vasiliev |
| 6,675,281 B1 | 1/2004 | Oh et al. |
| 6,732,124 B1 | 5/2004 | Koseki et al. |
| 6,772,274 B1 | 8/2004 | Estakhri |
| 6,829,688 B2 | 12/2004 | Grubbs et al. |
| 6,886,068 B2 | 4/2005 | Tomita |
| 6,895,468 B2 | 5/2005 | Rege et al. |
| 6,901,479 B2 | 5/2005 | Tomita |
| 6,920,455 B1 | 7/2005 | Weschler |
| 6,967,810 B2 | 11/2005 | Kasiraj et al. |
| 6,970,987 B1 | 11/2005 | Ji et al. |
| 7,055,055 B1 | 5/2006 | Schneider et al. |

(Continued)

FOREIGN PATENT DOCUMENTS

WO    2009/102425 A1    8/2009

OTHER PUBLICATIONS

Rosenblum, Mendel and Ousterhout, John K. (Feb. 1992), "The Design and Implementation of a Log-Structured File System." ACM Transactions on Computer Systems, vol. 10, Issue 1, pp. 26-52.

(Continued)

*Primary Examiner* — Eric S Cardwell (57) ABSTRACT

The present invention relates to methods and systems for efficiently accessing data stored on a data storage device. The data storage device may comprise various types of media, such as shingled media and non-shingled media, alone or in combination. The data storage device may employ a logical block address space for specifying location of blocks of data stored on the data storage device. In addition, pre-determined sequential ranges of logical block addresses are grouped together and may be referenced collectively. In some embodiments, each type of media type may be partitioned into sections for containing different sizes of collections. Each collection of logical block addresses may be allocated to an arbitrary logical slot. Each logical slot may then be linked to a physical slot on the data storage device.

23 Claims, 8 Drawing Sheets

(56) References Cited

U.S. PATENT DOCUMENTS

| | | |
|---|---|---|
| 7,155,448 B2 | 12/2006 | Winter |
| 7,343,517 B2 | 3/2008 | Miller et al. |
| 7,406,487 B1 | 7/2008 | Gupta et al. |
| 7,408,731 B2 | 8/2008 | Uemura et al. |
| 7,412,585 B2 | 8/2008 | Uemura |
| 7,472,223 B1 | 12/2008 | Ofer |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,526,614 B2 | 4/2009 | van Riel |
| 7,529,880 B2 | 5/2009 | Chung et al. |
| 7,539,924 B1 | 5/2009 | Vasquez et al. |
| 7,549,021 B2 | 6/2009 | Warren, Jr. |
| 7,590,816 B2 | 9/2009 | Shinohara et al. |
| 7,594,067 B2 | 9/2009 | Torabi |
| 7,603,530 B1 | 10/2009 | Liikanen et al. |
| 7,617,358 B1 | 11/2009 | Liikanen et al. |
| 7,620,772 B1 | 11/2009 | Liikanen et al. |
| 7,631,009 B1 | 12/2009 | Patel et al. |
| 7,647,544 B1 | 1/2010 | Masiewicz |
| 7,669,044 B2 | 2/2010 | Fitzgerald et al. |
| 7,685,360 B1 | 3/2010 | Brunnett et al. |
| 7,831,750 B2 | 11/2010 | Sampathkumar |
| 7,840,878 B1 | 11/2010 | Tang et al. |
| 7,860,836 B1 | 12/2010 | Natanzon et al. |
| 7,870,355 B2 | 1/2011 | Erofeev |
| 7,876,769 B2 | 1/2011 | Gupta et al. |
| 7,885,921 B2 | 2/2011 | Mahar et al. |
| 7,903,659 B2 | 3/2011 | Sindhu et al. |
| 7,965,465 B2 | 6/2011 | Sanvido et al. |
| 7,996,645 B2 | 8/2011 | New et al. |
| 8,006,027 B1 | 8/2011 | Stevens et al. |
| 8,214,684 B2 | 7/2012 | Hetzler et al. |
| 8,341,339 B1 | 12/2012 | Boyle et al. |
| 2002/0049886 A1 | 4/2002 | Furuya et al. |
| 2003/0123701 A1 | 7/2003 | Dorrell et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2004/0139310 A1 | 7/2004 | Maeda et al. |
| 2005/0069298 A1 | 3/2005 | Kasiraj et al. |
| 2005/0071537 A1 | 3/2005 | New et al. |
| 2005/0144517 A1 | 6/2005 | Zayas |
| 2005/0193035 A1 | 9/2005 | Byrne |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0168243 A1 | 7/2008 | Bychkov et al. |
| 2008/0183955 A1 | 7/2008 | Yang et al. |
| 2008/0183975 A1 | 7/2008 | Foster et al. |
| 2008/0195801 A1 | 8/2008 | Cheon et al. |
| 2008/0209144 A1 | 8/2008 | Fujimoto |
| 2008/0250200 A1 | 10/2008 | Jarvis et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0055620 A1 | 2/2009 | Feldman et al. |
| 2009/0063548 A1 | 3/2009 | Rusher et al. |
| 2009/0070529 A1 | 3/2009 | Mee et al. |
| 2009/0119353 A1 | 5/2009 | Oh et al. |
| 2009/0144493 A1 | 6/2009 | Stoyanov |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0235042 A1 | 9/2009 | Petrocelli |
| 2009/0240873 A1 | 9/2009 | Yu et al. |
| 2009/0271581 A1 | 10/2009 | Hinrichs, Jr. |
| 2010/0011275 A1 | 1/2010 | Yang |
| 2010/0208385 A1 | 8/2010 | Toukairin |
| 2010/0235678 A1 | 9/2010 | Kompella et al. |
| 2010/0281202 A1 | 11/2010 | Abali et al. |
| 2010/0318721 A1 | 12/2010 | Avila et al. |
| 2011/0138145 A1 | 6/2011 | Magruder et al. |
| 2011/0167049 A1 | 7/2011 | Ron |
| 2011/0197035 A1* | 8/2011 | Na et al. .................. 711/154 |

OTHER PUBLICATIONS

Rosenblum, "The Design and Implementation of a Log-structured File System", EECS Department, University of California, Berkeley, Technical Report No. UCB/CSD-92-696, Jun. 1992.

Garth Gibson and Milo Polte, "Directions for Shingled-Write and Two-Dimensional Magnetic Recording System Architectures: Synergies with Solid-State Disks", Parallel Data Lab, Carnegie Mellon Univ., Pittsburgh, PA, Tech. Rep. CMU-PDL-09-014 (2009).

Amer, Ahmed et al. (May 2010) "Design Issue for a Shingled Write Disk System" 26th IEEE Symposium on Massive Storage Systems and Technologies: Research Track.

Denis Howe, "Circular Buffer Definition", 2010, The Free On-Line Dictionary of Computing, pp. 1-3, http://dictionary.reference.com/browse/circular+buffer.

The PC Guide, "Logical Block Addressing (LBA)", Sep. 2,2000, pp. 1-2, http://web.archive.org/web/2000090203261 2/http://www.pcguide.com/ref/hdd/bios/modesLBA-c. html.

Robert Hinrichs, "Circular Buffer", Sep. 11, 2002, pp. 1-22, http://www.codeproject.com/Articles/2880/Circular-Buffer.

Margaret Rouse, "Logical Block Addressing (LBA)", Apr. 2005, pp. 1-16, http://searchcio-midmarket.techtarget.com/definition/logical-block-addressing.

* cited by examiner

METHOD FOR FILE BASED SHINGLED DATA STORAGE UTILIZING MULTIPLE MEDIA TYPES

BACKGROUND

Typically, files are stored on a data storage system, such as a hard disk, solid-state drive, or hybrid drive. The files are written using file system data structures using logical blocks that are understood by the operating system of a host. The logical blocks are then mapped to a physical location on the data storage device. Conventionally, the logical blocks are a relatively small size, such as 4 k. Accordingly, a file is broken down into a plurality of blocks when stored.

The operating system will organize files on the disk, such as, file names and the sequence of physical locations on the disk areas that hold the file. One problem with breaking down a file from a host into small blocks is fragmentation. Fragmentation is a condition in which a requested file has been broken up into blocks and these blocks are scattered around at different locations on a disk. Over time, fragmentation of files will increase on a disk as files are updated, added, and deleted. Eventually, without correction, fragmentation can significantly degrade the performance of the disk because each file has been broken up into numerous pieces.

When a file is broken up, the disk requires a plurality of input (I/O) disk operations in order to retrieve and assemble the data for a requested file. When it takes more than one disk operation to obtain the data for a fragmented file, this is known as a split transfer or split I/O. For every split transfer, the overhead of each disk I/O transfer is added. The more I/O requests, the longer user applications running on a host device must wait for I/O to be processed.

Unfortunately, fragmentation of a drive is not a simple problem. Files for different media types will have different sizes and different access characteristics by the application using that file. Accordingly, it would be desirable to provide methods and systems for storing and accessing files stored on a data storage device more efficiently.

BRIEF DESCRIPTION OF THE DRAWINGS

Systems and methods which embody the various features of the invention will now be described with reference to the following drawings, in which.

DETAILED DESCRIPTION

The present invention is directed to systems and methods for writing host data to "files" on the media, rather than in blocks. A data storage file is a sequential range of logical block address LBA space, which are referred to as slots in the present disclosure. In other words, a file or slot is pinned to a contiguous LBA range. The "files" on the media are not required to be contiguous or physically "pinned". For shingled media, the files are shingled and therefore can be written at the end of a shingle or separated by guard bands.

A data storage device of the present invention may contain any combination of shingled and non-shingled media. Therefore, files on the media may be either shingled or non-shingled. Since the files contain LBAs that are sequential, this design can take advantage of speculative reading for performance.

Files may contain a pre-designated range of LBAs where the LBAs are contiguous and sequential with in the file. For example a file may contain 4 MB of 512 or 4 k LBAs. For maximum format efficiency in shingled media, files in a shingled area are allocated at the end of the shingle. For non-shingled media, the files can be allocated at any block address within the non-shingled area. The files can be allocated dynamically.

Each media type of the data storage device may be split into sections or zones. Each section or zone may have different file sizes based on a number of conditions or requirements. Multiple shingle zones may be based on different files sizes (1/2/4 MB, etc.). In one embodiment, the data storage device utilizes a translation table and garbage collection process that is aware of these media zones for different files.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
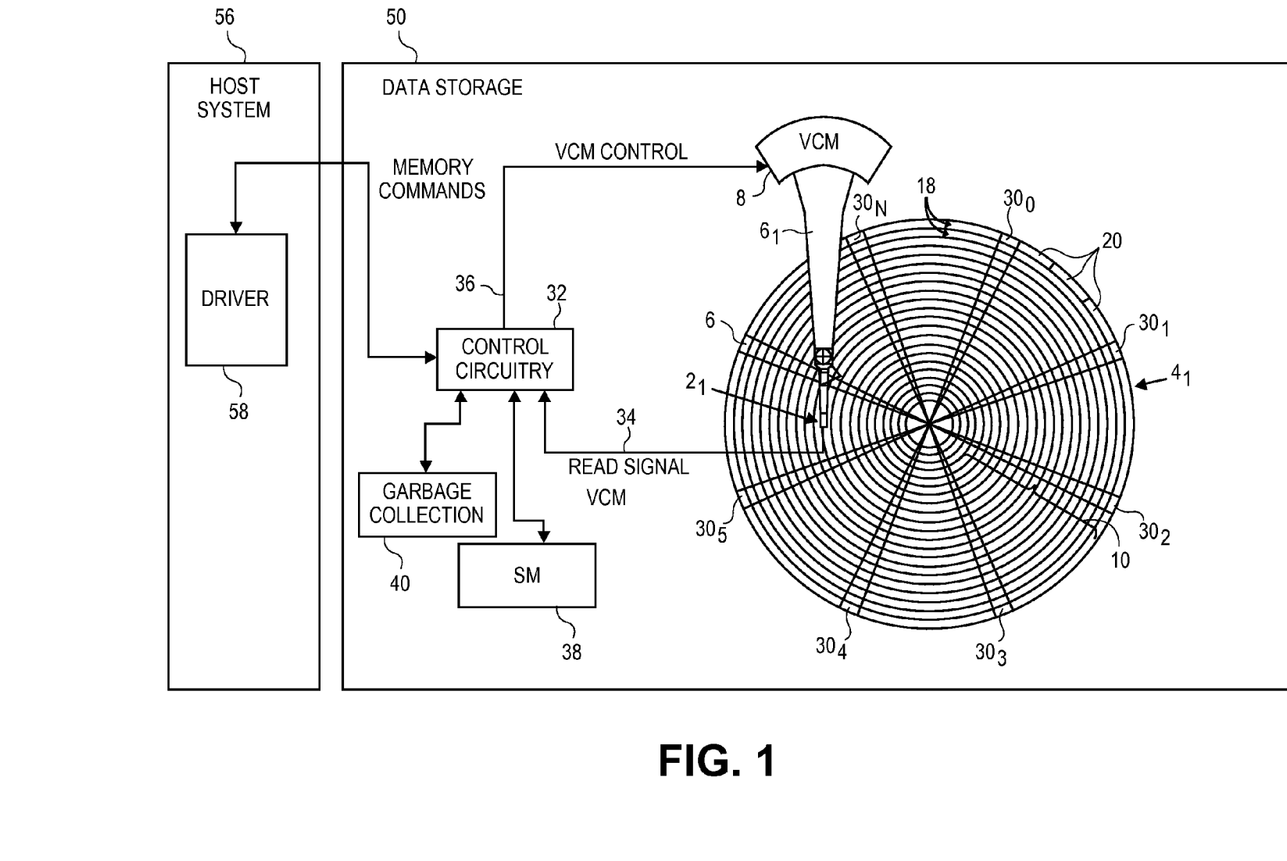
FIGS. 1 and 1A is a block diagram illustrating a data storage device according to one embodiment.

FIG. 1 shows a data storage device 50 according to one embodiment. The data storage device 50 includes a head $2_1$ actuated radially over a disk surface $4_1$ by an actuator arm $6_1$, and a voice coil motor (VCM) 8 operable to rotate the actuator arm $6_1$ about a pivot. The disk surface 4, such as $4_1$, comprises a host addressable area 10 with a plurality of data tracks 18, wherein each data track 18 comprises a plurality of data blocks 20.

In the embodiment in FIG. 1, the disk surface $4_1$ further comprises a plurality of embedded servo sectors $30_1$-$30_N$ that define the data tracks 18 in the host addressable area 10. The data storage device 50 further comprises control circuitry 32, which is operable to process a read signal 34 emanating from the head 21 to demodulate the embedded servo sectors $30_1$-$30_N$ and generate a position error signal (PES). The PES represents a radial offset of the head 21 from a target data track 18 in the host addressable area 10. The control circuitry 32 is further operable to process the PES with a suitable servo compensator to generate a VCM control signal 36 applied to the VCM 8. The VCM 8 rotates the actuator arm 61 about a pivot in order to actuate the head 21 radially over the disk surface $4_1$ in a direction that decreases the PES. The control circuitry 32 is also configured to receive commands from a driver 58 in the host system 56. Of note, the embodiments of the present invention may operate in form of interface communications between the host 56 and data storage device 50. For example, the embodiments may be applied to SCSI, SATA, SAS, etc., communications.

For shingled files, a write to the same LBA(s) may require a read of the file containing the LBA(s), a merge of the file read data and host data and a write to a new file at the end of shingle. Read, Modify, Writes of shingled files may not require a read first, if the entire files is contained in cache and/or transferred from the host 56.

For non-shingled files, a write to the same LBA(s) may occur in place requiring no further action or file allocation. The use of a non-shingled area is to have a set of files that can be randomly written quickly without the need for read, modify and write, resulting in a fast write area. This area will be used for random host writes as well. This area can be large enough to hold, for example, an operating system plus most frequently used user data. Less frequently used data can be migrated to the shingled files area. This will allow for standard disk drive performance during random writes and mitigates random write performance by allowing re-writing of data in place. Non-shingled files do not require adjacent or range of files to be located in non-shingled file area.

In one embodiment, the data storage device 50 may be a hybrid drive, and thus, may further comprise a solid-state storage space, such as a semiconductor memory (SM) 38 communicatively coupled to the control circuitry 32. The SM 38 may serve as a cache for storing write data received from the host 56 via a write command and read data requested by the host 56 via a read command. The SM 38 can be implemented with one or more memories, for example, using dynamic random access memory (DRAM), flash memory, or static random access memory (SRAM).

In addition, the SM 38 may provide storage for a translation table used by the control circuitry 32. The translation table provides a data structure for mapping the logical block addresses (LBAs) requested by the host 56 into physical locations on the data storage device 50, such as on disk surfaces 4. On data storage devices that implement shingled magnetic recording, such as those shown in FIG. 2, commands from the host 56 are recorded sequentially, resulting in LBA indirection. Since there is no fixed location on the data storage device 50 for a given LBA, control circuitry 32 maintains the translation table to keep track of the locations of the LBAs. For example, when a LBA is rewritten, a newer copy of that LBA will be written in a new location on the disk surfaces 4, and control circuitry 32 then updates the translation table to reflect the latest physical location of that LBA.

A translation table, however, may consume significant memory resources, for example, of the SM 38, especially for larger capacity data storage devices. In one embodiment, to minimize the space used by the translation table, it may be made run-length enabled.

Accordingly, the embodiments of the present invention provide a way to optimize the size of a translation table and read performance. For example, in one embodiment, defragmentation is performed regularly to avoid excessive fragmentation of the drive. Defragmentation is a process where fragmented LBAs are read and rewritten sequentially to avoid fragmentation. In addition, the translation table is updated and optimized to reduce its required size.

Figure 1A:
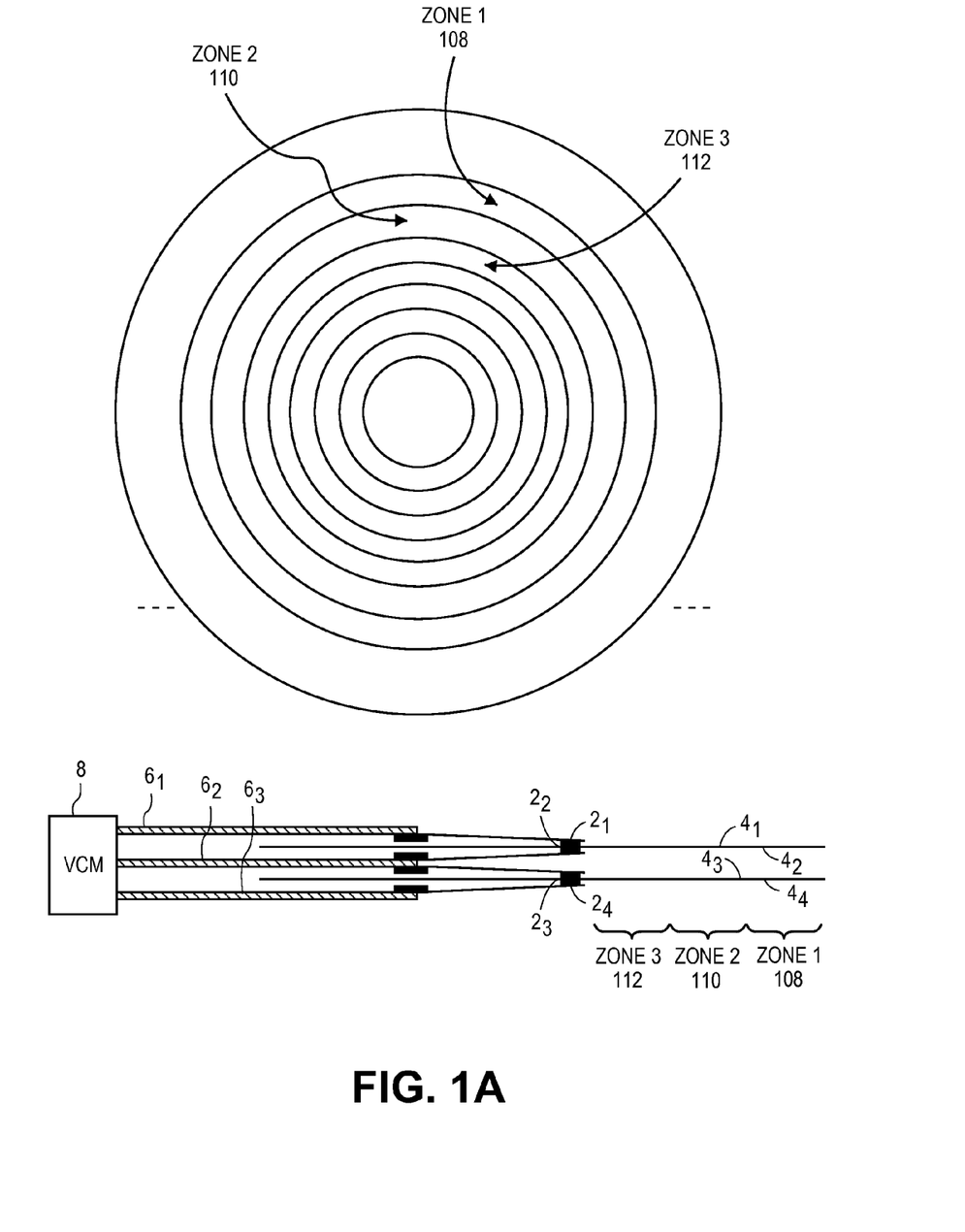

FIG. 1A is a block diagram illustrating a shingled portion of the disk storage device 50 having a plurality of zones according to one embodiment. In other words, one embodiment of the data storage device 50 may be a shingled-based disk drive in which the control circuitry 32 accesses at least part of the storage using log structure writes wherein a band of the data tracks are accessed as a circular buffer. In the shingled-based disk drive embodiment, data tracks are written in a shingled (overlapping) manner.

As shown, for example, the data storage device 50 is divided into multiple zones, including a zone 1 (108), a zone 2 (110), and a zone 3 (112). A plurality of heads $2_1$-$2_4$ are actuated over respective disk surfaces $4_1$-$4_4$ by a VCM 8 which rotates actuator arms $6_1$-$6_3$ about a pivot. In one embodiment, each of disk surfaces $4_1$-$4_4$ comprises a host addressable area 10 comprising a plurality of data tracks 18. A zone may span multiple layers of the disk as shown. For example, zone 1 (108) may span a portion of the disk surfaces $4_1$, $4_2$, $4_3$, and $4_4$ as indicated by the bracket. Similarly, zone 2 (110) may span a portion of the disk surfaces $4_1$, $4_2$, $4_3$, and $4_4$ as indicated by the bracket.

As noted, each media type may be split into sections or zones. Each section or zone may have different file sizes based on a number of conditions or requirements. Multiple shingle zones may be based on different files sizes, such as 1 MB, 2 MB, 4 MB, and the like.

Figure 2:
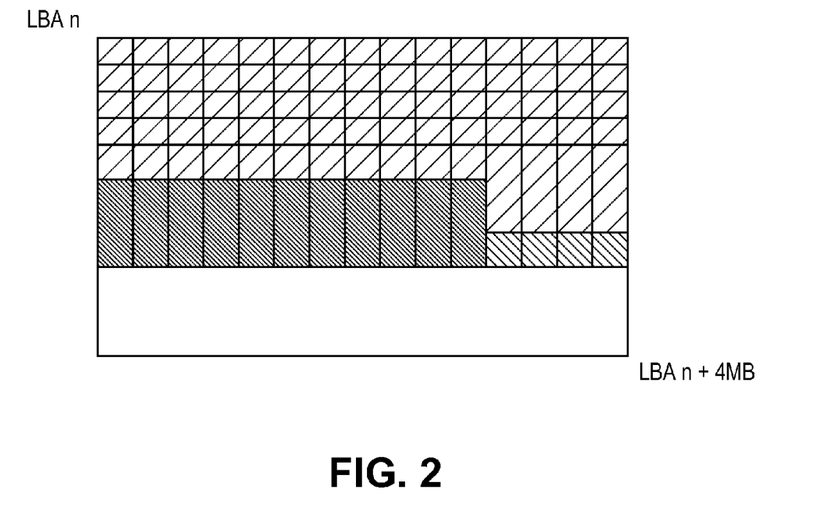
FIG. 2 illustrates an exemplary file structure for a shingled file according to one embodiment.

FIG. 2 illustrates an exemplary file structure for a shingled file according to one embodiment. As shown, shingled files may contain a pre-designated range of LBAs where the LBAs are contiguous and sequential with in the file. For example, as shown a file may contain 4 MB of LBAs. For maximum format efficiency in shingled media, files in a shingled area are allocated at the end of the shingle.

With this structure, translation of a file from logical to physical is merely an offset calculation. For example, a file containing LBAs n to n+100 can be located by adding the physical offset to the file to the physical block address representing LBA n. As noted, these physical and logical locations may be referred to as "slots" in the present disclosure. As will be described further below, the translation table may be configured based on the use of slots. For example, physical slots are contiguously allocated from the first addressable LBA. Files thus may reside in arbitrary logical slots with a 1:1 link to a physical slot.

Shingled files, regardless of LBA range within the file, are located at the end of the shingle in the next physical slot. Physical slots may be over provisioned for garbage collection and runway.

For shingled files, a write to the same LBA(s) may require a read of the file containing the LBA(s), a merge of the file read data and host data and a write to a new file at the end of shingle. Read, Modify, Writes of shingled files may not require a read first, if the entire files is contained in cache and/or transferred from the host 56.

In contrast, for non-shingled files, a write to the same LBA(s) may occur in place requiring no further action or file allocation. Accordingly, in one embodiment, data storage device 50 may employ the use of a non-shingled area to store files that can be randomly written quickly without the need for read, modify and write, resulting in a fast write area. This area may be used for random writes by host 56 for writes as well.

In one embodiment, the area is configured to hold the operating system of host 56 plus frequently used user data. Less frequently used data can be migrated to shingled files on the data storage device 50. One skilled in the art will recognize that this feature may allow for standard disk drive performance during Random Writes and mitigates random write performance by allowing re-writing of data in place.

The embodiments allow for any combination of shingled and non-shingled files. The use of both shingled and non-shingled files on a rotating media allows for different types of media access and performance. With the non-shingled zone being located at the fastest data rate area of a rotating media.

Any file can be written in any non-shingled physical slot. This allows for the flexibility of having any Host write (random or sequential) data to be written directly and allows for most recently Used and most accessed algorithms for populating the physical slots. However, over time, the files in these non-shingled slots in the non-shingled zone can be migrated to other media types and zones including shingled zones.

Alternatively, the data storage device 50 may use "pinned" LBA range(s). In other words, a slot is tied to a range of pinned LBAs for taking advantage of random write performance. This approach may be beneficial for certain types of files that only utilize a sub-capacity of the data storage device 50.

Figure 3:
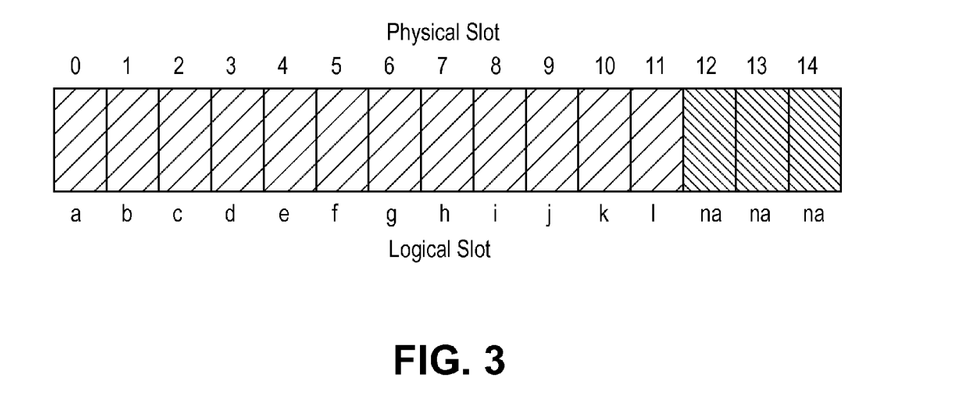
FIG. 3 illustrates an exemplary translation of logical slots to physical locations on the data storage device.
Figure 4:
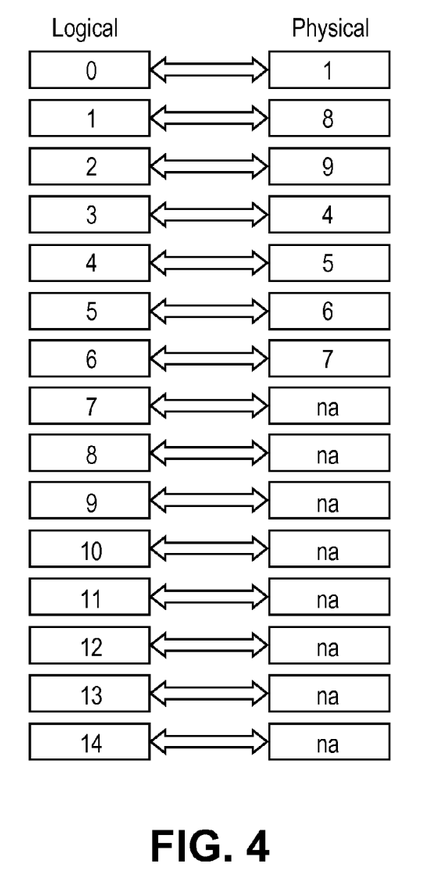
FIG. 4 illustrates an exemplary translation table according to one embodiment.

FIG. 3 illustrates an exemplary translation of logical slots to physical locations on the data storage device. FIG. 4 illustrates an exemplary translation table according to one embodiment.

As shown, the translation table can be sorted by a logical slot number. If a file is written to a logical slot, then the control circuitry 32 writes an entry that points to a physical slot on disk surface 4 of the data storage device 50. As can be seen, there is a 1:1 correlation between logical and physical slots. In one embodiment, unused physical slots are unassigned to logical slots.

With this feature of the embodiments, the translation table can be small enough to be direct-mapped, since it is essentially an array of entries directly indexed by logical address. That is, the entry for a logical slot points to a respective physical slot. The translation table thus does not have to describe extents and the translation table is not run length limited. Of note, reverse lookup can be achieved by sorting the translation table according to physical slot number and indexing as such.

Figure 5:
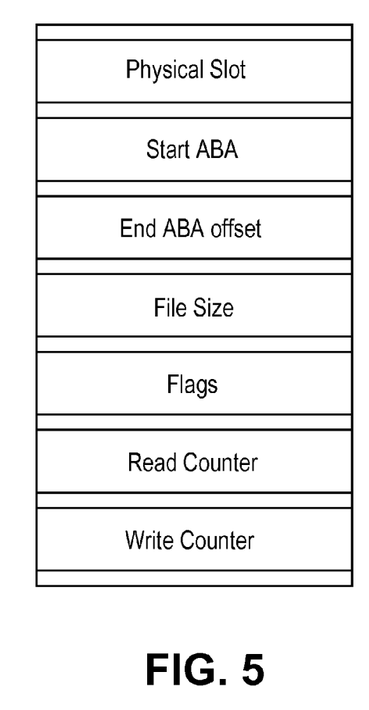
FIG. 5 illustrates an exemplary translation table entry of the translation table shown in FIG. 4.

FIG. 5 illustrates an exemplary translation table entry of the translation table shown in FIG. 4. As shown, an entry of the translation table may comprise a physical slot identifier, a starting block address (ABA), an ending block address (ABA), a file size, various flags, a read counter, and a write counter. Of course, other meta-data may be included in the translation table entries to facilitate other processes, such as garbage collection, defragmentation, check pointing, recovery, etc. In one embodiment, the translation table entry is configured to be a relatively small size, such as approximately 8 bytes. This allows for the translation table to consume a relatively small amount of memory in SM 38. For example, for a 1 TB and assuming a file size of 4 MB, the embodiments are able to provide a translation table that is about 2 MB.

Figure 6:
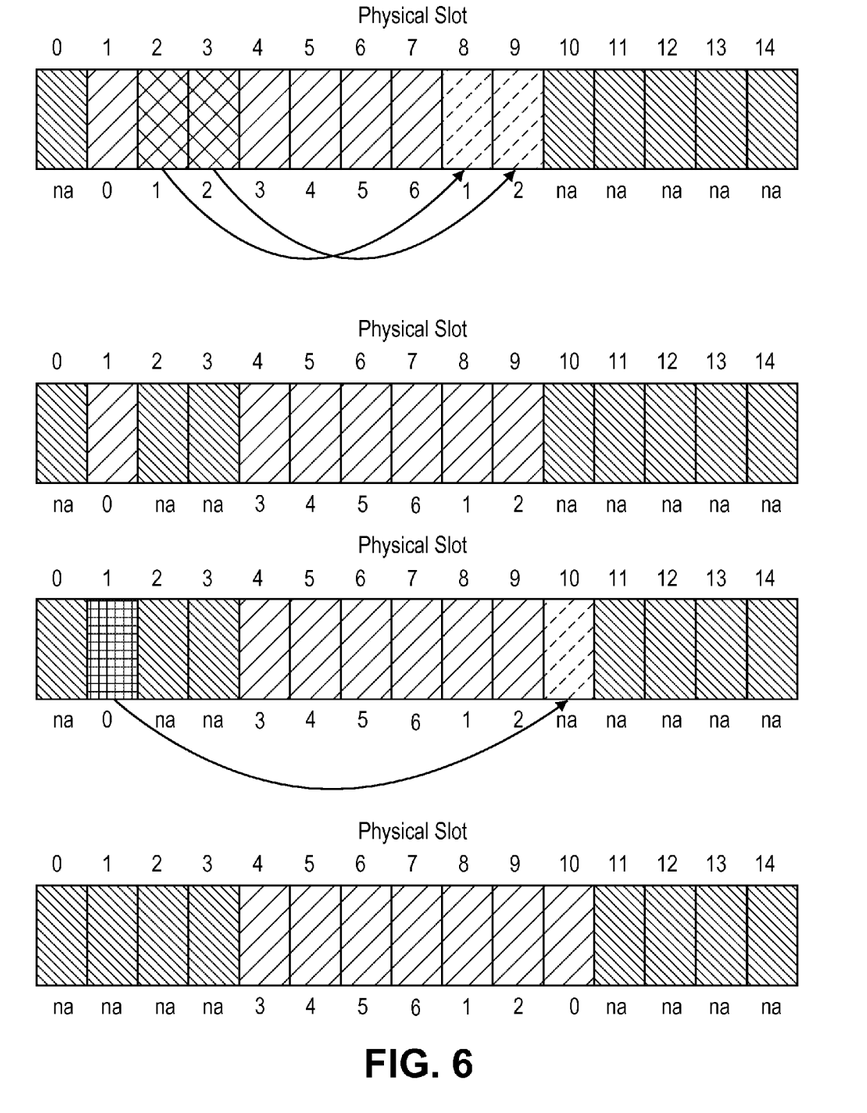
FIG. 6 illustrates an exemplary garbage collection process according to one embodiment.

FIG. 6 illustrates an exemplary garbage collection process according to one embodiment. In the embodiments, garbage collection may be performed on a "file" basis. As LBAs are re-written, the "file" undergoes a read modify write (RMW) to a new physical slot. The old physical slot thus becomes "garbage". This "garbage" then presents a hole in the shingle, e.g., physical slots 2 and 3, as shown. In addition, the logical slots 1 and 2 have been moved and reassigned to physical slots 8 and 9, respectively. The translation table is updated to reflect this reassignment (not shown).

Next, garbage collection moves the stranded files caused by RMW to the end of shingle. The translation table is also updated with the new physical slot (not shown). Thus, the garbage collection may provide a constant contiguous shingle more efficiently based on the present embodiments. One advantage of this embodiment is that the notion of invalid data does not apply. Searching the translation table for valid LBAs is not required, as only invalid files exist. Accordingly, garbage collection is simplified to being a file read-write and translation table update. Of note, since non-shingled-files do not require a RMW at the end of a shingle, there will not be any garbage created in the non-shingled zone in one embodiment.

As RMWs are performed during normal operation, garbage collection will move the oldest written file. Thus, the embodiments may prevent any need to do periodic or urgent garbage collection. This provides predictable performance and overhead with a constant performance impact as at least one advantage of the present invention.

If requested or necessary, time-based or urgency-based garbage collection may be provided using arbitration. Arbitration may be employed to increase the performance impact when garbage increases and increase steady state performance.

Defragmentation of the data area for shingled files may be performed by sorting the files logically in the physical slots. Logical sorting can resemble the logical layout of conventional disk drives. Logically sorted, the data storage device 50 may be able to take advantage of speculative reading. Defragmentation can be a background activity to reduce performance impact Of note, defragmentation is not required for non-shingled files or pinned files. Defragmentation is also not required for shingled files since the data storage device 50 will not run out of space in SM 38 for the translation table even without defragmentation.

Furthermore, in some embodiments, the control circuitry 32 may balance garbage collection and defragmentation in order to optimize the performance of the data storage device. For example, in the embodiments, since defragmentation may create garbage, the control circuitry 32 may be configured to proactively write valid data to these areas, especially if they are within proximity to a current defragmented file. Proximity may be based on a number of factors, such as distance, track proximity, seek time, etc.

Figure 7:
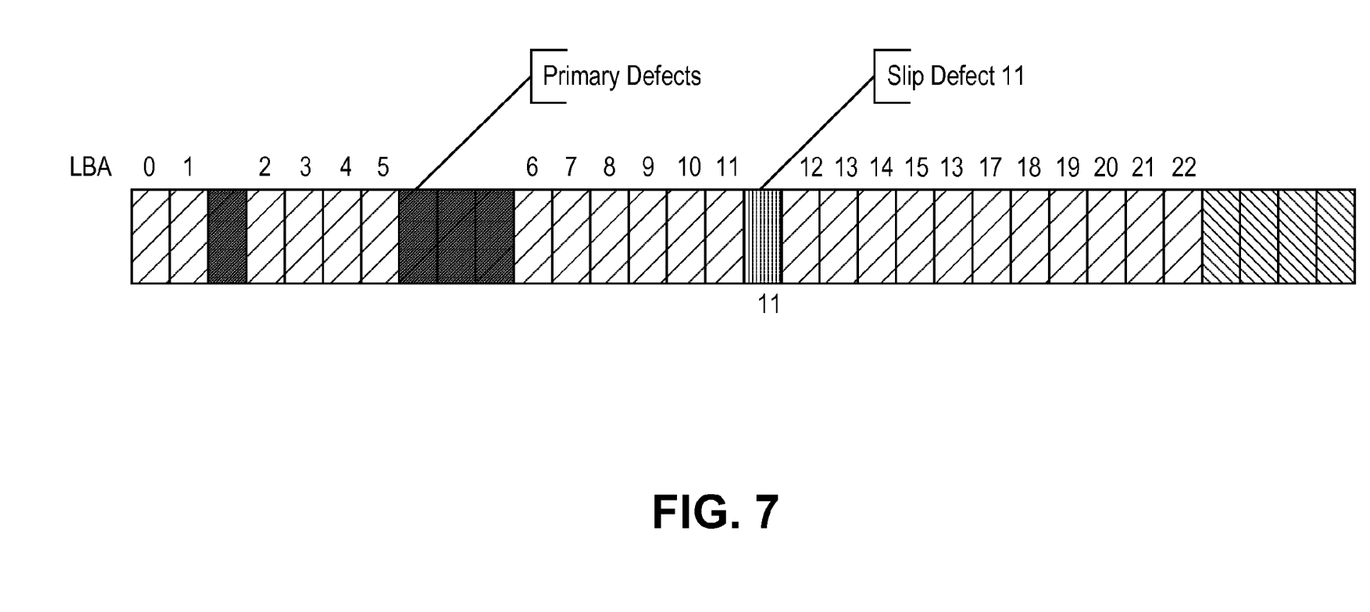
FIG. 7 illustrates an exemplary defect mapping according to one embodiment.
Figure 8:
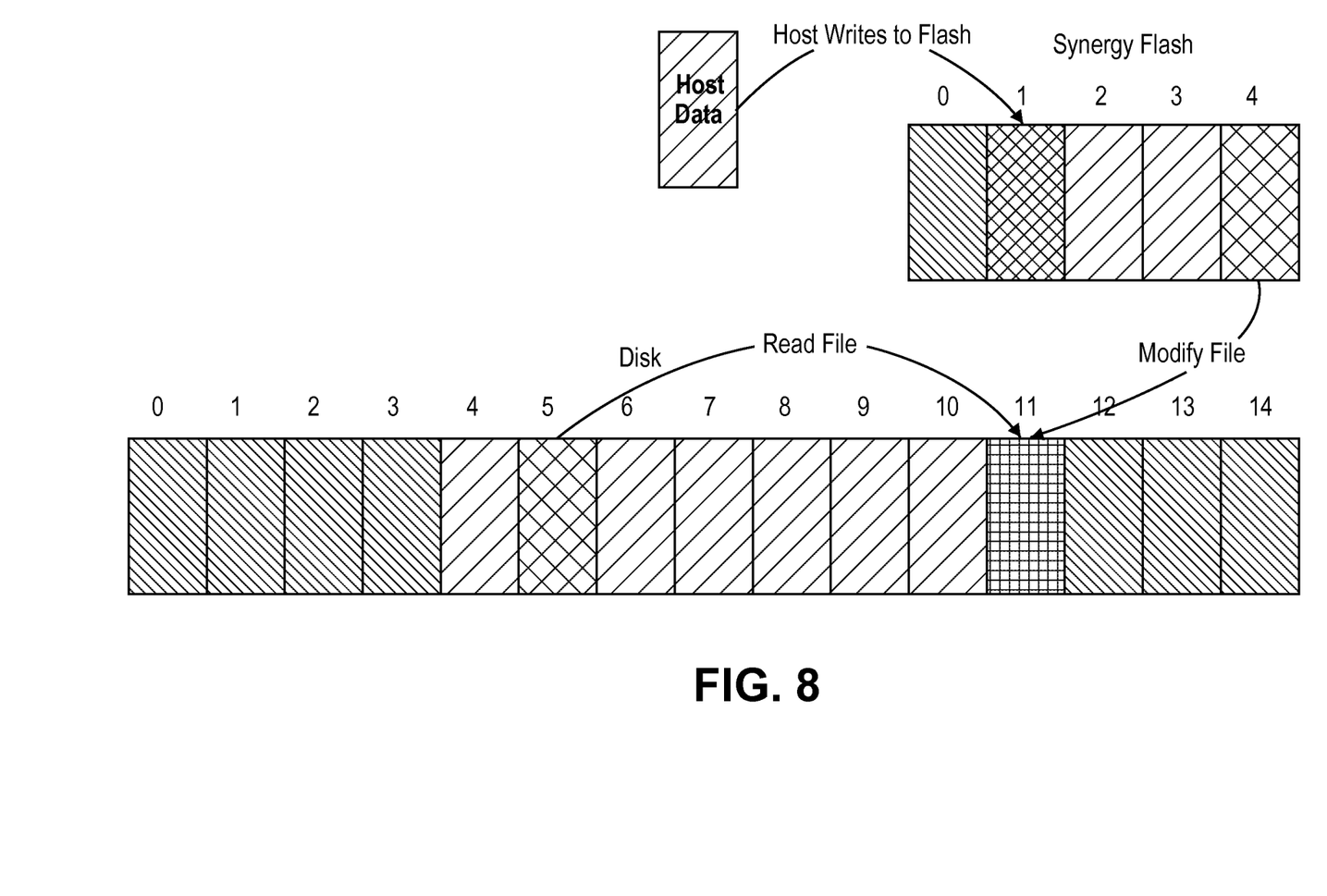
FIG. 8 illustrates an exemplary file migration according to one embodiment.

FIG. 7 illustrates an exemplary defect mapping according to one embodiment. As shown, defects can be added to a defect mapping list without re-format. In particular, the defect can be added by inserting the entry for the physical address for all files after the growth defect and then adding a check point. Inserting of such an entry can be quickly performed since translation tables of the embodiments are relatively small and direct mapped FIG. 8 illustrates an exemplary file migration according to one embodiment. As shown, files may be identical for all media types. This allows for easy file migration between disk surfaces 4 and SM 38. The same translation table can thus handle shingled and non-shingled files on all media types.

As shown, host data may be written to the flash memory in SM 38, which is used as a write cache. The SM 38 will allow random and sequential writes to occur at flash write rates. The writes to flash can then be migrated to the "file" on the disk-based storage of data storage device 50.

Figure 9:
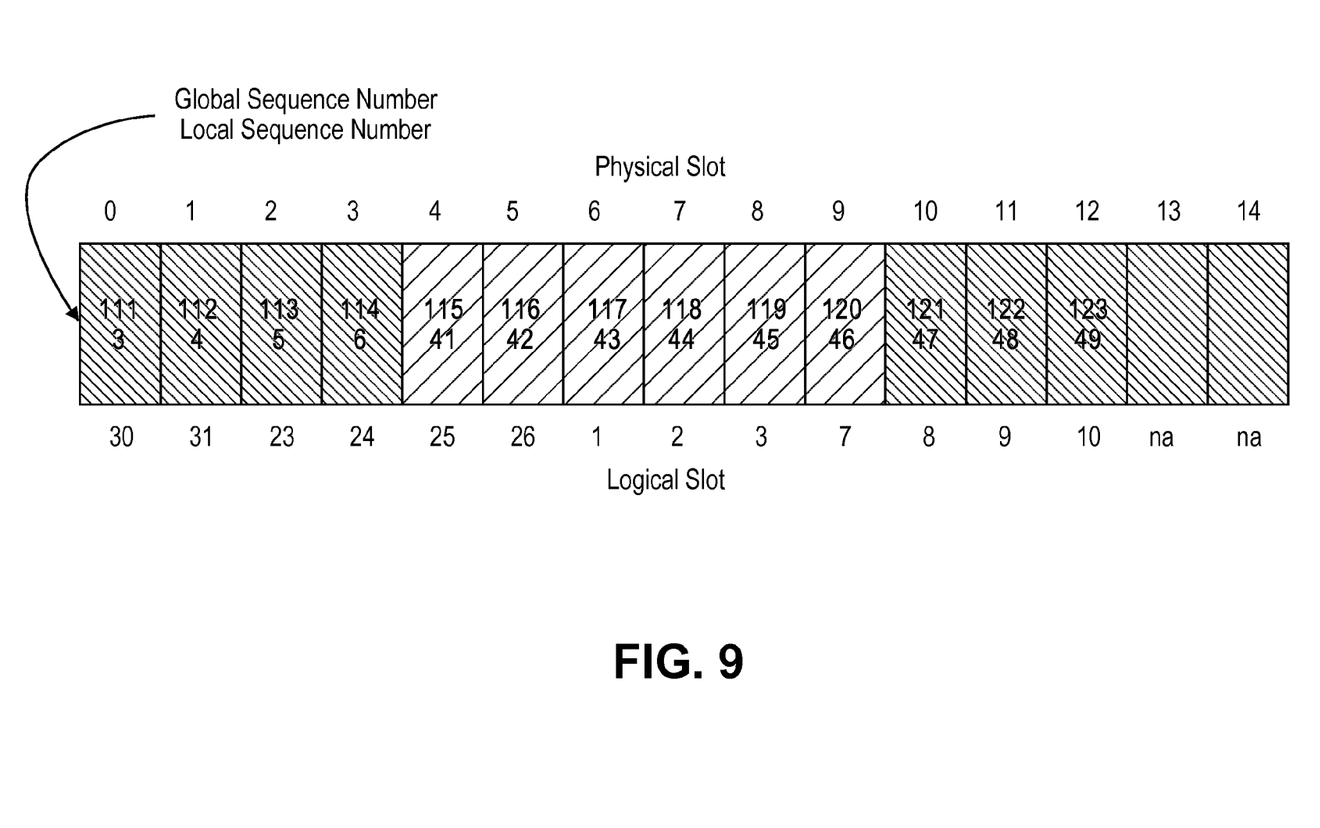
FIG. 9 illustrates an exemplary recovery from an event according to one embodiment.

FIG. 9 illustrates an exemplary recovery from an event according to one embodiment. In one embodiment, changes to the translation table may be check pointed to media periodically to maintain the current status of the files on the media(s). The check point may be stored on non-volatile memory so that the translation table can be restored, e.g., at power on.

Thus, in a power loss situation, the translation table can be restored from non-volatile memory in SM 38. If check pointing of the translation table is done at the event of any changes to content of the translation table, prior to any writing to files, the current state of the translation table will be valid. In one embodiment, translation table updates may be a single sector write since the entries are less than 1 sector.

In the embodiments, check pointing at the event of any changes to the translation table can be used for multiple zones. The media(s) may be split into multiple zones for multiple active streams. The state of the streams can also be stored in the translation table entries and check pointed in the same way. In this embodiment, power on recovery would not be needed to restore the translation as the current state of the translation table is always preserved before any writing to files occur. In addition, since the current state of the translation table is preserved, meta data is not needed to rebuild the translation table.

If check pointing cannot be done on a translation table change, then meta data may be required and retrieved to re-build the translation table, for example, in the event of a power loss. The meta data may be any data that contains the logical to physical slot relationship and local and global sequence numbers for validation. For example, such meta data may be stored at the end of each file and systematically generated as they are written.

In one embodiment, in the event of a power loss, power on recovery may start at the end of shingle in the last known check point location and scan for meta data at the end of each file. The meta data will be compared against the logical and physical slots as well as the sequence numbers. If the meta data does not match up or does not exist, the translation table reconstruction is complete.

For example, as shown in FIG. 9, check pointed writes up to physical slot 9 are illustrated. The remaining three writes, however, are not check pointed. The last sequence numbers to be check pointed are thus 120/46. By scanning the files past the end of the shingle and reading the local sequence numbers, three more files in the shingle have been written. The global sequence number also indicates that there were no other zones updated prior. The slot relationship in the translation table is then updated and check pointed to complete power on recovery.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of writing host data to rotating media of a data storage device, wherein the rotating media includes a shingled area and a non-shingled area, said method comprising:
   receiving at least one logical block address for data to be written on the rotating media of the data storage device;
   determining a pre-designated range corresponding to the at least one logical block address;
   determining a logical slot for the pre-designated range corresponding to the at least one logical block address, wherein the logical slot corresponds to the shingled area or the non-shingled area of the rotating media based on a characteristic of the data; and
   writing the data in a physical slot allocated on the rotating media for the logical slot.

2. The method of claim 1, wherein the pre-designated range corresponding to the at least one logical block address comprises a contiguous, sequential range of logical block addresses.

3. The method of claim 1, wherein the logical slot comprises a file size of one megabyte or less.

4. The method of claim 1, wherein the logical slot comprises a file size of two megabyte or less.

5. The method of claim 1, wherein the logical slot comprises a file size of four megabyte or less.

6. The method of claim 1, wherein writing the data comprises determining a zone allocated on the rotating media that has been configured to store files for a threshold size.

7. The method of claim 1, wherein the characteristic of the data includes at least one of a frequency of use of the data, whether the data can be written quickly, and whether the data pertains to a host operating system.

8. The method of claim 1, further comprising migrating less frequently used data from the non-shingled area to the shingled area of the rotating media.

9. A method of reading data from rotating media of a data storage device, wherein the rotating media includes a shingled area and a non-shingled area, said method comprising:
   receiving a read command from a host comprising at least one logical block address;
   determining a pre-designated range corresponding to the at least one logical block address specified in the read command;
   determining a logical slot for the pre-designated range, wherein the logical slot corresponds to the shingled area or the non-shingled area of the rotating media based on a characteristic of the data;
   translating the logical slot to a physical slot on the rotating media of the data storage device; and
   reading the requested data from the physical slot.

10. The method of claim 9, wherein the pre-designated range comprises a contiguous sequential range of logical block addresses.

11. The method of claim 10, further comprising speculatively reading data corresponding to other logical block addresses in the pre-designated range for the logical slot.

12. The method of claim 9, wherein translating the logical slot to the physical slot comprises determining an offset value from a starting logical block address of the pre-designated range.

13. The method of claim 9, wherein the logical slot comprises a file size of one megabyte or less.

14. The method of claim 9, wherein the logical slot comprises a file size of two megabyte or less.

15. The method of claim 9, wherein the logical slot comprises a file size of four megabyte or less.

16. The method of claim 9, wherein the characteristic of the data includes at least one of a frequency of use of the data, whether the data can be written quickly, and whether the data pertains to an operating system of the host.

17. The method of claim 9, further comprising migrating less frequently used data from the non-shingled area to the shingled area of the rotating media.

18. A data storage device comprising:
   rotating media including a shingled area and a non-shingled area for storing data;
   an interface configured for communications with a host; and
   a controller configured to receive at least one logical block address from the host via the interface, wherein pre-designated ranges of logical block addresses are assigned to data allocated to respective logical slots corresponding to the shingled area or the non-shingled area based on a characteristic of the data, and
   wherein the logical slots are mapped to respective physical slots on the rotating media.

19. The data storage device of claim 18, wherein the rotating media comprises a rotatable disk.

20. The data storage device of claim 18, wherein the rotating media is partitioned into a plurality of zones, and wherein different zones of the plurality of zones are configured based on a predetermined physical slot size.

21. The data storage device of claim 18, wherein the controller is further configured to translate logical slots to physical slots based on a direct mapped translation table specifying an offset from a starting logical block address for each logical slot.

22. The data storage device of claim 18, wherein the characteristic of the data includes at least one of a frequency of use of the data, whether the data can be written quickly, and whether the data pertains to an operating system of the rotating host.

23. The data storage device of claim 18, wherein the controller is further configured to migrate less frequently used data from the non-shingled area to the shingled area of the rotating media.

\* \* \* \* \*